United States Patent
Takahashi

(10) Patent No.: US 10,324,425 B2
(45) Date of Patent: Jun. 18, 2019

(54) HUMAN COLLABORATIVE ROBOT SYSTEM HAVING IMPROVED EXTERNAL FORCE DETECTION ACCURACY BY MACHINE LEARNING

(71) Applicant: FANUC CORPORATION, Yamanashi (JP)

(72) Inventor: Shougo Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/782,371

(22) Filed: Oct. 12, 2017

(65) Prior Publication Data
US 2018/0107174 A1  Apr. 19, 2018

(30) Foreign Application Priority Data
Oct. 19, 2016  (JP) .................................. 2016-205481

(51) Int. Cl.
| | | |
|---|---|---|
| G05B 13/02 | (2006.01) | |
| G05B 9/02 | (2006.01) | |
| G05B 13/04 | (2006.01) | |
| B25J 9/16 | (2006.01) | |

(52) U.S. Cl.
CPC ............ G05B 13/027 (2013.01); B25J 9/163 (2013.01); G05B 9/02 (2013.01); G05B 13/04 (2013.01); G05B 2219/36489 (2013.01); G05B 2219/39164 (2013.01); G05B 2219/39165 (2013.01); G05B 2219/40202 (2013.01)

(58) Field of Classification Search
CPC ........ G05B 13/027; G05B 13/04; G05B 9/02; G05B 2219/39164; G05B 2219/39165; G05B 2219/40202; G05B 2219/36489; B25J 9/163
See application file for complete search history.

(56) References Cited

U.S. PATENT DOCUMENTS

2012/0237042 A1  9/2012  Hirohata et al.

FOREIGN PATENT DOCUMENTS

| EP | 2324967 A2 | 5/2011 |
|---|---|---|
| JP | H7-319558 A | 12/1995 |
| JP | 5356527 B2 | 12/2013 |
| JP | 2016-153156 A | 8/2016 |

*Primary Examiner* — Cuong B Nguyen
(74) *Attorney, Agent, or Firm* — Hauptman Ham, LLP

(57) ABSTRACT

A human collaborative robot system having a function of detecting a force includes a human collaborative robot and a learning unit into which sensing data, internal data, and calculation data are input. The learning unit outputs a first force component applied to the human collaborative robot from outside, a second force component occurring in an operation of the human collaborative robot, and a third force component categorized as noise; and performs learning using supervised data in which inputs and correct labels obtained in advance are collected in pairs, wherein the correct labels of the supervised data are obtained by exerting a force on the human collaborative robot from outside, operating the human collaborative robot over a plurality of paths, and applying noise to the human collaborative robot, and the operation of the human collaborative robot is controlled based on the first force component output from the learning unit.

15 Claims, 14 Drawing Sheets

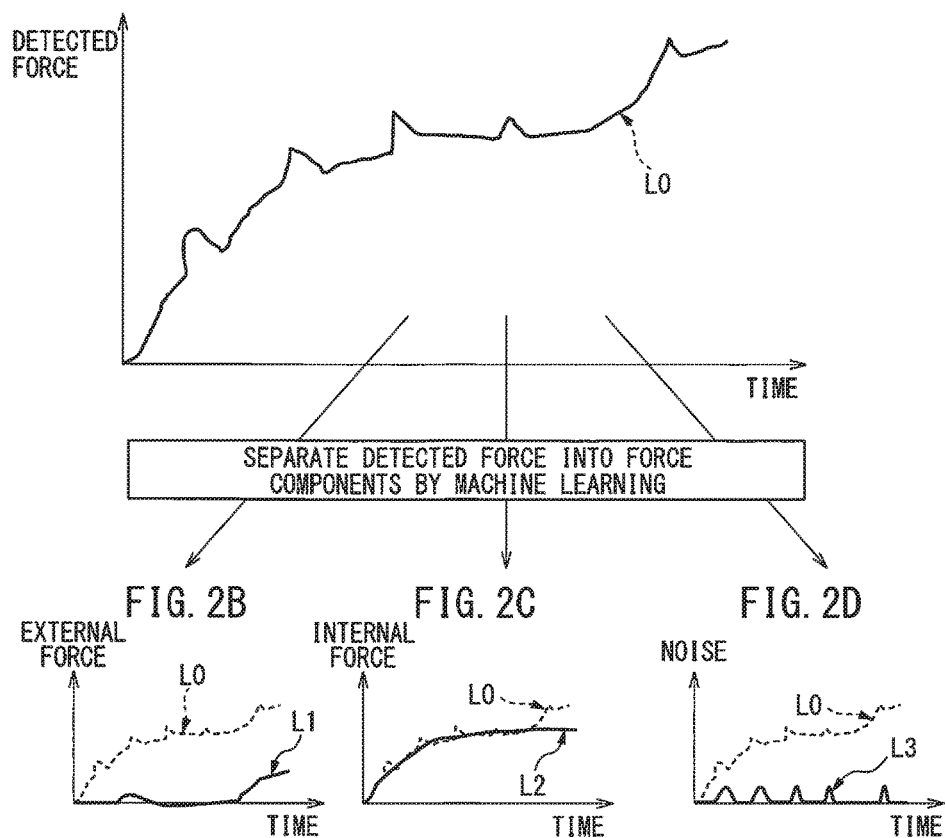

HUMAN COLLABORATIVE ROBOT SYSTEM HAVING IMPROVED EXTERNAL FORCE DETECTION ACCURACY BY MACHINE LEARNING

RELATED APPLICATIONS

The present application claims priority to Japanese Patent Application No. 2016-205481 filed Oct. 19, 2016, the disclosure of which is hereby incorporated by reference herein in its entirety.

BACKGROUND OF THE INVENTION

1. Field of the Invention

The present invention relates to a human collaborative robot system that has improved external force detection accuracy by machine learning.

2. Description of Related Art

Robot systems conventionally take measures for human safety, in which humans are inhibited from entering operation areas of robots during operation of the robots. For example, a safety bar is provided around the robot, for the purpose of inhibiting humans from entering the inside of the bar during operation of the robot.

In recent years, robots (human collaborative robots) that operate in collaboration (cooperation) with humans have been studied, developed and in practical use. In the human collaborative robot (human collaborative robot system), for example, the robot and a human (operator or user) perform one operation in a collaborative manner without providing a safety bar around the robot.

What is important for the human collaborative robot is that when the robot contacts a human, the robot stops, sidesteps, or evacuates without applying more than a predetermined force to the human. Also, in the collaborative operation with the human, precisely detecting a force of the human allows the robot to operate with higher accuracy. In other words, an improvement in detection accuracy (detection ability) of an external force brings about an improvement in the ability of the human collaborative robot.

On the other hand, when a force other than an external force, e.g. extraneous noise, ambient vibration and the like is mistakenly recognized as the external force, the robot may stop improperly or malfunction. Thus, precisely separating an external force from an internal force and noise results in an improvement in detection accuracy of the external force and hence an improvement in the ability of the robot.

A detected force is mainly separated into three components i.e. an external force, an internal force and noise. The external force is a force exerted on the robot from outside and is mainly a force that the human exerts on the robot. The internal force is a force generated in the operation of the robot including a vibration component due to the operation of itself. The noise is an external force component, which does not need to detect, generated by electrical noise or ambient vibration.

To calculate an external force, for example, a logical internal force calculated from an operation command value and the like of the robot may be subtracted from a force detected by a force sensor. In this case, however, the external force includes noise. Furthermore, since the force sensor detects a force generated by vibration due to the operation of the robot itself, the calculated external force includes the force generated by the vibration of the robot.

The robot stops when, for example, the external force exceeds a certain threshold value. The external force calculated as described above includes noise and the force generated by the vibration of the robot and therefore, for example, may cause the robot to stop improperly.

By the way, for example, EP Patent Publication No. 2324967 discloses a system in which a force sensor provided in a J1 base (a base of a J1 axis) detects forces and moments in XYZ directions and a robot (human collaborative robot) is controlled using the detected forces and moments in the XYZ directions. For example, Japanese Patent No. 5356527 proposes a signal separation device in which a signal separation method by machine learning is applied to acoustic signals, in order to improve accuracy in separation of the acoustic signals on a scene-by-scene basis.

Conventionally, as described above, the system that controls the robot using the forces and moments in the XYZ directions detected by the force sensor provided in the J1 base and the signal separation device having the improved acoustic signal separation accuracy using machine learning are proposed.

In the human collaborative robot system, since a calculated external force includes noise and a force generated by vibration of the robot, the detection accuracy of the external force is reduced and therefore, for example, the robot may be stopped improperly.

Considering the above problems, an object of the present invention is to provide a human collaborative robot system having improved external force detection accuracy.

SUMMARY OF INVENTION

According to a first aspect of the present invention, there is provided a human collaborative robot system having a function of detecting a force including a human collaborative robot for performing operation in collaboration with a human; and a learning unit into which sensing data for calculating the force, internal data of control software for controlling the human collaborative robot, and calculation data obtained based on one of the sensing data and the internal data are input, the learning unit outputting a first force component applied to the human collaborative robot from outside, a second force component occurring in the operation of the human collaborative robot, and a third force component categorized as noise, the learning unit for performing learning using supervised data in which the inputs and correct labels obtained in advance are collected in pairs, wherein the correct labels of the supervised data are obtained by exerting a force on the human collaborative robot from outside, operating the human collaborative robot over a plurality of paths, and applying noise to the human collaborative robot, and the operation of the human collaborative robot is controlled based on the first force component output from the learning unit.

Forces having different magnitudes and different directions may be exerted on a plurality of portions of the human collaborative robot stopped in a plurality of postures, and the exerted forces and the inputs to the learning unit may be collected in pairs as the supervised data of the first force component. Force components occurring when the human collaborative robot may operate over the plurality of paths, while holding a plurality of types of works, and the inputs to the learning unit are collected in pairs as the supervised data of the second force component. A noise source may be applied to the human collaborative robot stopped in a plurality of postures, and fourth force components occurring by the noise source and the inputs to the learning unit may be collected in pairs as the supervised data of the third force component.

A mode for teaching at least one of the first force component and the second force component may be prepared. The human collaborative robot may include a function of choosing a model group to be learned by the learning unit from model groups of the collected supervised data; or a function of recommending a model group to be used in accordance with an application, from model groups of a recorded force. The learning unit may perform online learning to extract a feature of the detected force, and separate the detected force into the first force component, the second force component and the third force component based on the extracted feature. The human collaborative robot may be put in a non-collaborative operation mode in which no operation area is shared with the human, and in the non-collaborative operation mode, the learning unit may perform online learning on the condition that a correct label of the first force component is set at "0". The human collaborative robot may include a control device having a function of stopping the human collaborative robot, when the separated first force component exceeds a certain threshold value, and after the stop of the human collaborative robot, when a first input signal indicating that the stop is caused by a false detection of the first force component by the learning unit is input, the learning unit may perform online learning using input data immediately before the stop of the human collaborative robot and a correct label of an external force set at a value lower than the certain threshold value in a pair.

The human collaborative robot may include a control device having a function of stopping the human collaborative robot, when the separated first force component exceeds a certain threshold value, and after the stop of the human collaborative robot, when a second input signal indicating that the stop is caused by a normal detection of the first force component by the learning unit is input, an input signal to and an output signal from the learning unit immediately before the stop of the human collaborative robot may be stored in a memory as the supervised data, and the supervised data stored in the memory may be used in online learning thereafter. The first input signal and the second input signal may also function as operation restart signals for the human collaborative robot. The second input signal may be generated by the human, or using an image recognition result by a camera for imaging the human collaborative robot or a signal from an approach sensor.

The human collaborative robot system may include a function of stopping the human collaborative robot when the separated first force component exceeds a certain threshold value, and a function of detecting an urgent force pattern when the human stops the human collaborative robot by application of an external force, when the urgent force pattern is detected, the learning unit may perform online learning using input data immediately before the detection of the urgent force pattern and a correct label of an external force set at a value higher than the certain threshold value in a pair. The human collaborative robot system may further include a plurality of human collaborative robots, wherein each of the human collaborative robots may perform learning in an independent manner, and the human collaborative robots may mutually exchange or share a plurality of results of learning independently performed by each of the human collaborative robots through a network. The first force component may be an external force exerted by the human on the human collaborative robot; the second force component may be an internal force generated in the operation of the human collaborative robot; and the third force component may be noise applied to the human collaborative robot, or the human collaborative robot may performs storing a log of a force detected by the human collaborative robot in one cycle of a taught operation program; storing logs of the force detected in a plurality of cycles; applying signal synthesis or signal processing to the logs of the force detected in the cycles, to extract a force component occurring in the operation of the robot; and performing online learning by the learning unit, using the extracted force component occurring in the operation of the human collaborative robot as a correct label.

BRIEF DESCRIPTION OF THE DRAWINGS

The present invention will be understood more clearly by referring to the following accompanying drawings.

FIG. 2A, FIG. 2B, FIG. 2C and FIG. 2D are drawings that schematically show components of a force separated by a machine learning device in the robot system of FIG. 1;

FIG. 3 is a table showing an example of the relationship between each force component and features of an input signal;

DETAILED DESCRIPTION

Figure 17:
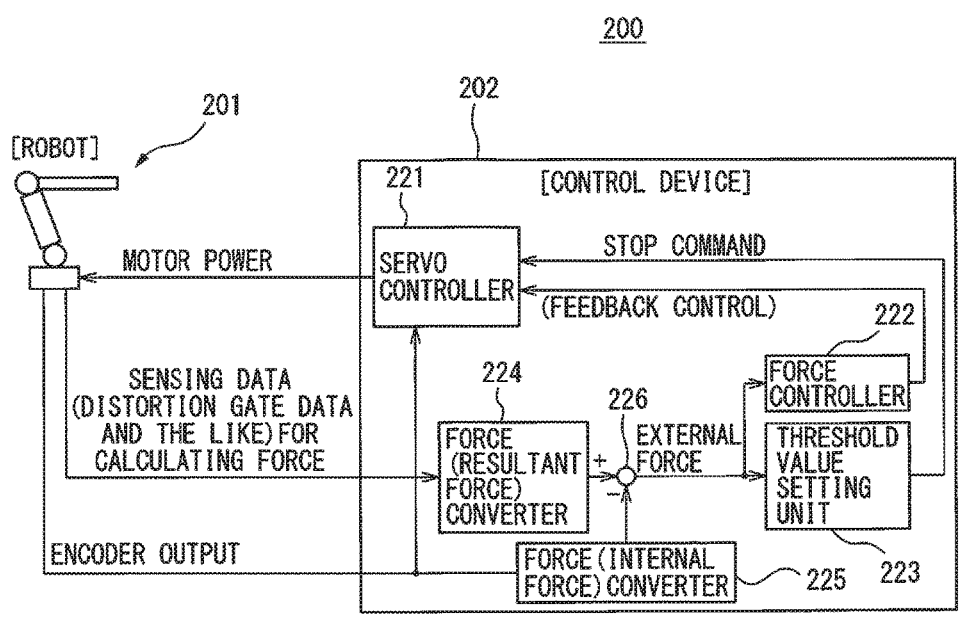
FIG. 17 is a block diagram of an example of a robot system as related art.

First, an example of a human collaborative robot system and problems thereof will be described with reference to FIG. 17, before embodiments of a robot system. FIG. 17 is a block diagram of the example of the human collaborative robot system as related art. In FIG. 17, reference number 200 indicates a human collaborative robot system, reference number 201 indicates a human collaborative robot (robot) and reference number 202 indicates a control device.

As shown in FIG. 17, the human collaborative robot system 200 includes, for example, the human collaborative robot 201 that operates in collaboration (cooperation) with a human (not shown operator or user) and the control device 202 for controlling the robot 201. The control device 202 includes a servo controller 221, a force controller 222, a threshold value setting unit 223, a force (resultant force) converter 224, a force (internal force) converter 225 and an adder 226.

The servo controller 221, which controls motors of the robot 201, provides motor power to each motor to perform servo control. To the servo controller 221, for example, an encoder output of the robot 201, an output signal of the force controller 222, a stop command from the threshold value setting unit 223 and the like are input. The resultant force converter 224, for example, converts a signal from a force sensor provided in a J1 base of the robot 201 into a resultant force, and outputs the resultant force to the adder 226. The internal force converter 225 converts the encoder output of the robot 201 into an internal force, and outputs the internal force to the adder 226.

An external force is a force exerted on the robot from outside and is mainly a force that the human exerts on the robot. The internal force is a force occurring in the operation of the robot and includes a vibration component due to the operation of the robot 201 in itself. The resultant force is a force into which the external force, the internal force and noise are summed up. Note that, the noise can be regarded as an external force component, which does not need to detect, caused by electrical noise or ambient vibration. The input signal of the resultant force converter 224 is not limited to the signal from the force sensor provided in the J1 base of the robot 201, but may be sensing data (for example, distortion gage data) to calculate a force exerted on each axis or a certain portion of the robot 201.

The adder (subtracter) 226 subtracts the output (internal force) of the internal force converter 225 from the output (resultant force) of the resultant force converter 224 to obtain an external force and outputs the external force to the force controller 222 and the threshold value setting unit 223. The force controller 222 outputs a signal for feedback control to the servo controller 221 based on the external force supplied from the adder 226. The servo controller 221 also receives the other signals described above and provides power to each motor of the robot 201. The threshold value setting unit 223 determines a certain threshold value. For example, when the external force from the adder 226 exceeds the certain threshold value, the threshold value setting unit 223 issues a stop command to the servo controller 221 to stop the robot 201.

In the robot system (human collaborative robot system) 200, as shown in FIG. 17, for example, the external force is calculated by subtracting the logical internal force, which is calculated from an operation command value of the robot and the like, from the force (resultant force) detected by the force sensor. However, in this case, the external force includes noise, and the resultant force (external force) includes, for example, a force occurring by vibration of the robot.

In other words, in the human collaborative robot system 200, since the external force output from the adder 226 includes the noise and the force occurring by the vibration of the robot, the detection accuracy of the external force is low. When the external force output from the adder 226 exceeds the certain threshold value, the threshold value setting unit 223 issues the command to stop the robot 201, and thus this may cause a false stop of the robot.

Figure 1:
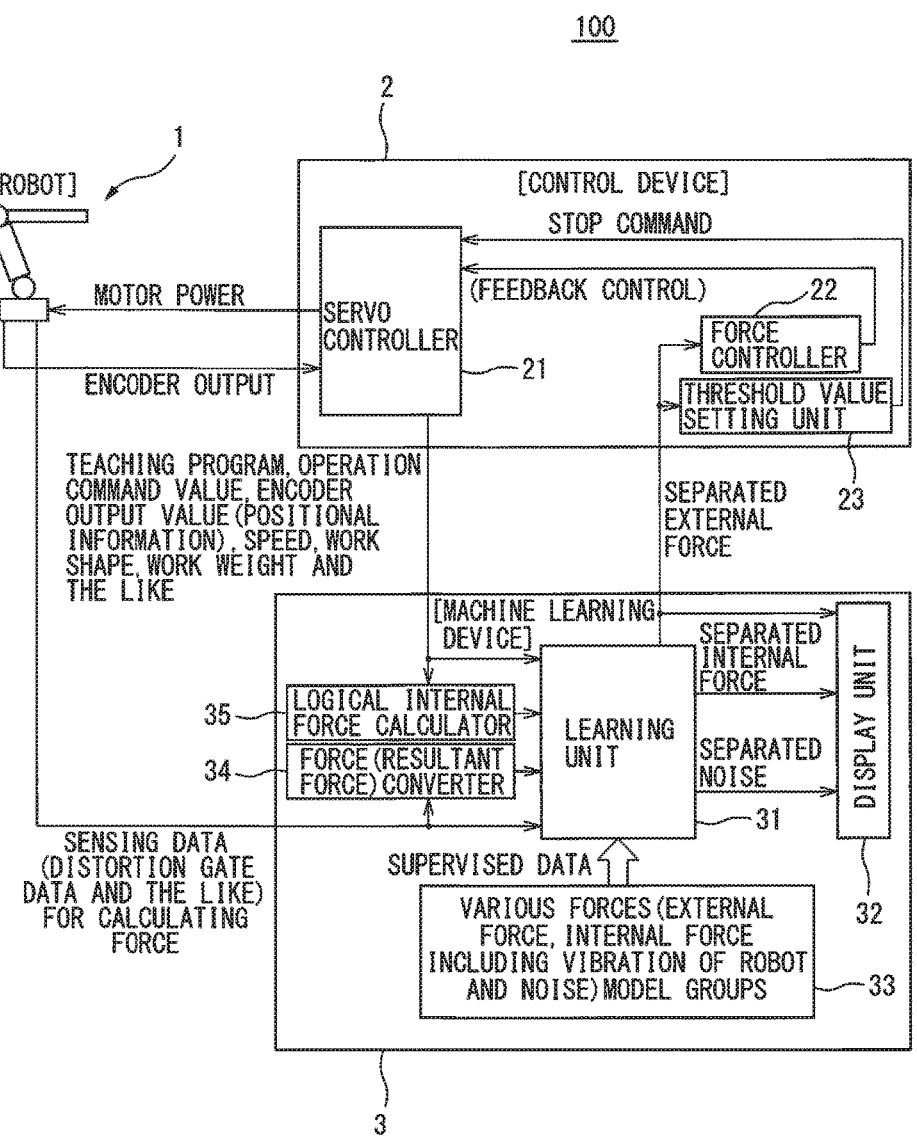
FIG. 1 is a block diagram of a robot system according to an embodiment of the present invention.

An embodiment of a human collaborative robot system according to the present invention will be described below in detail with reference to the attached drawings. FIG. 1 is a block diagram of the robot system according to the embodiment of the present invention. In FIG. 1, reference number 100 indicates a human collaborative robot system, reference number 1 indicates a human collaborative robot (robot), reference number 2 indicates a control device, and reference number 3 indicates a machine learning device.

As shown in FIG. 1, the human collaborative robot system 100 according to this embodiment includes, for example, the robot 1 that operates in collaboration (cooperation) with a human (not shown operator or user), the control device 2 for controlling the robot 1, and the machine learning device 3 that provides the control device 2 with an external force separated by machine learning. The control device 2 includes a servo controller 21, a force controller 22, and a threshold value setting unit 23. The servo controller 21, which controls motors of the robot 1, provides motor power to each motor to perform servo control. To the servo controller 21, for example, an encoder output of the robot 1, an output signal of the force controller 22, a stop command from the threshold value setting unit 23 and the like are input.

The machine learning device 3 includes a learning unit 31, a display unit 32, various force (an external force, an internal force including vibration of the robot and noise) model groups 33, a force (resultant force) converter 34 and a logical internal force calculator 35. The display unit 32, the various force model groups 33, the resultant force converter 34 and the logical internal force calculator 35, in addition to the learning unit 31, are provided in the machine learning device 3 in FIG. 1, but may be provided outside the machine learning device 3. The various force model groups 33 may be provided from outside. Furthermore, the machine learning device 3 may be installed in the control device 2, or in a fog server or a cloud server through a communication line.

The logical internal force calculator 35 receives various types of information (data) e.g. a teaching program, an operation command value, an encoder output value (positional information), a speed, a work shape, a work weight and the like from the servo controller 21. The logical internal force calculator 35 calculates an internal force occurring in the operation of the robot, and outputs the internal force to the learning unit 31. The resultant force converter 34 receives sensing data (e.g. distortion gate data and the like) from the robot 1 to calculate a force. The resultant force converter 34 calculates a resultant force, and outputs the resultant force to the learning unit 31. To the learning unit 31, for example, the various types of data e.g. the teaching program, the operation command value, the encoder output value (positional information), the speed, the work shape, the work weight and the like from the servo controller 21 and the sensing data from the robot 1 are input too.

The sensing data to be input to the resultant force converter 34 may be a signal from a force sensor provided in a J1 base of the robot 1, or data from a sensor provided in each axis or a certain portion of the robot 1 to calculate a force. The resultant force is represented as, for example, "resultant force"="external force"+"internal force (internal force including vibration of robot)"+"noise".

The learning unit 31 performs, for example, supervised learning in which the learning unit 31 receives supervised data from outside. For example, the various force (external force, internal force including vibration of the robot and noise) model groups 33 correspond to the supervised data. The model groups will be described later.

An external force separated by the learning unit 31 is output to the force controller 22 and the threshold value setting unit 23 of the control device 2. Furthermore, in the example of FIG. 1, the external force, an internal force and noise separated by the learning unit 31 are output to the display unit 32 and displayed on the display unit 32 in a predetermined manner. To display the external force, the internal force and the noise, the display unit 32 may adopt various display methods, and in addition, may adopt a method other than the display methods, e.g. issuing an alarm. The display unit 32 is not necessarily provided, and as described above, may be provided outside the machine learning device 3 or in the control device 2.

The force controller 22 receives the separated external force output from the learning unit 31 (machine learning device 3) and outputs a signal for feedback control based on the separated external force to the servo controller 21. The threshold value setting unit 23 establishes a certain threshold value. For example, when the separated external force output from the machine learning device 3 exceeds the threshold value, the threshold value setting unit 23 issues a stop command to the servo controller 21 to stop the robot 1.

FIG. 2A, FIG. 2B, FIG. 2C and FIG. 2D are drawings that schematically show force components separated by the machine learning device in the robot system of FIG. 1. FIG. 2A shows a detected force component (a resultant force: an output of the resultant force converter 34) L0. FIG. 2B shows a separated external force (an external force output from the learning unit 31 to the force controller 22, the threshold value setting unit 23 and the display unit 32) L1, together with L0. FIG. 2C shows a separated internal force (an internal force output from the learning unit 31 to the display unit 32) L2, together with L0. FIG. 2D shows separated noise (noise output from the learning unit 31 to the display unit 32) L3, together with L0.

As shown in FIG. 2A to FIG. 2D, the machine learning device 3 of the robot system 100 of FIG. 1 can separate the resultant force L0 of FIG. 2A into the external force L1 of FIG. 2B, the internal force L2 of FIG. 2C and the noise L3 of FIG. 2D.

In the human collaborative robot system 100 described above, for example, a general-purpose computer or processor may be used as the machine learning device 3, but using GPGPU (general-purpose computing on graphics processing units), a large-scale PC cluster and the like allow an increase in processing speed. The machine learning device 3 may be installed in the robot control device (control device 2), as described above, or in a server on a network through a communication line such as Ethernet™.

The learning unit 31 may be constituted of a neural network, by way of example. Furthermore, for example, an input and an external force separation result are collected in advance by experiment. A large number of data pairs of an input and a result may be prepared and provided for the learning unit 31 to perform unsupervised learning, in which features of the data sets are learned to obtain a model for predicting a result from an input, in other words, to obtain the relationship between an input and a result in a recursive manner. In this embodiment, a recurrent neural network is useful to model time-series data having temporal correspondence.

Furthermore, for example, the sensing data may be pre-processed by signal processing before being input to the learning unit 31, or as one of the functions of the learning unit 31. Especially, as a useful method for separating force components, there is conversion by FFT (fast Fourier transform) and the like into a frequency range. A designer of the machine learning device may install such data features on the machine learning device 3. The teaching program and the operation command value may be used for learning the relationship between a force feature and the posture of the robot 1, as well as for calculating a logical internal force of the robot 1.

As described above, the robot system (human collaborative robot system) 100 according to this embodiment includes the human collaborative robot 1 that operates in collaboration with a human and has the function of detecting a force. To the learning unit 31 of the machine learning device 3, sensing data for calculating a force, internal data of control software for controlling the human collaborative robot, and calculation data obtained based on one of the sensing data and the internal data are input. The learning unit 31 outputs a first force component applied to the human collaborative robot from outside, a second force component occurring in the operation of the human collaborative robot, and a third force component categorized as noise. The learning unit 31 performs learning using supervised data that includes pairs of an input and a correct label obtained in advance. The correct labels of the supervised data are obtained by exerting a force on the human collaborative robot from outside, operating the human collaborative robot over a plurality of paths, and applying noise to the human collaborative robot. The learning unit 31 outputs the correct labels. The operation of the human collaborative robot is controlled based on the first force component (an external force that the human exerts on the human collaborative robot) applied to the human collaborative robot 1. Therefore, for example, the external force, which is separated from the internal force including vibration of the robot and the noise, can be detected with high accuracy.

FIG. 3 is a table showing an example of the relationship between each force component and features of an input signal. The relationship, as shown in FIG. 3, is generally established between each force component and the features of the input signal. In other words, an external force has a relatively low frequency and a low correlation with the posture and speed of the robot, and does not occur at regular intervals. An internal force including vibration of the robot has a relatively middle frequency and a high correlation with the posture and speed of the robot, and does not occur at regular intervals. Furthermore, noise has a relatively high frequency and a middle correlation with the posture and speed of the robot, and may occur at regular intervals. The learning unit 31 may automatically obtain such relationship by learning, or the relationship may be explicitly installed by, for example, a designer of the machine learning device 3.

As to post-processing of the output signals (separated external force, internal force and noise: separation results) from the learning unit 31, this embodiment describes that output results of the neural network directly become force separation results. However, as another embodiment, the output results of the learning unit 31 may be a few types of pairs of a frequency and a strength, and adaptive notch filters may be applied based on the results to a resultant force detected by a sensor to separate an external force.

Figure 4:
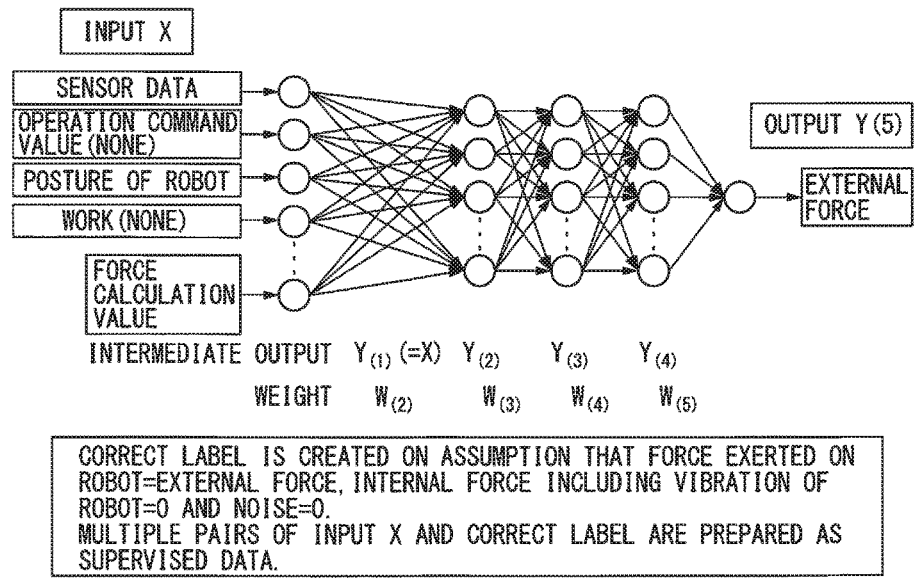
FIG. 4 is a (first) drawing that shows model groups of each type of force.
Figure 5:
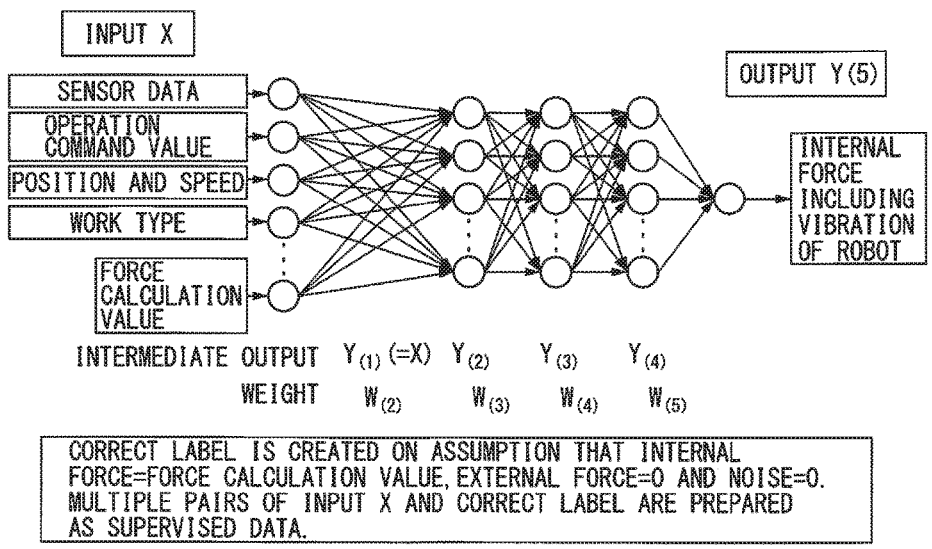
FIG. 5 is a (second) drawing that shows model groups of each type of force.
Figure 6:
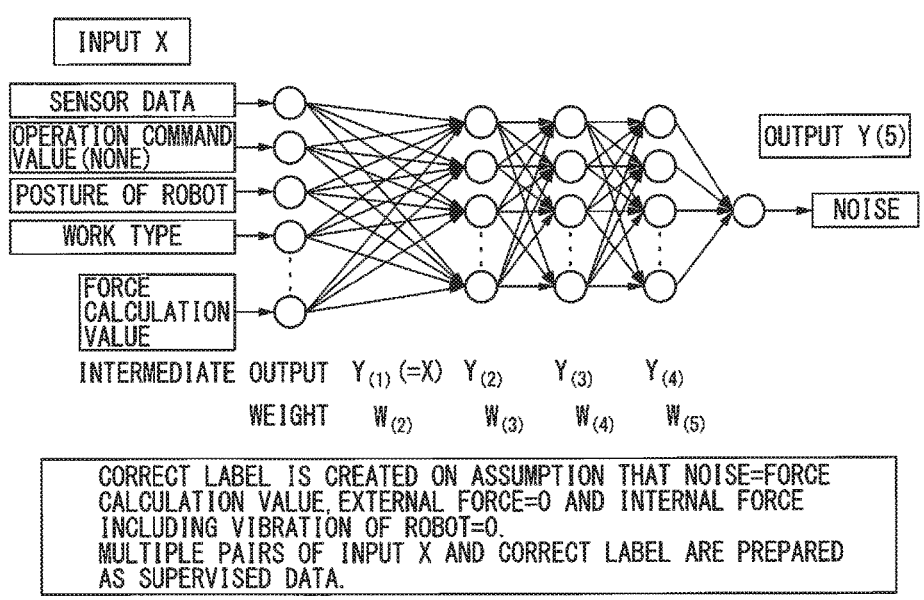
FIG. 6 is a (third) drawing that shows model groups of each type of force.

Next, as to the various force (external force, internal force including vibration of the robot and noise) model groups 33 provided for the learning unit 31, external force models, internal force models including vibration of the robot and noise models will be described. FIG. 4 to FIG. 6 are drawings of various force model groups. FIG. 4 shows external force models. FIG. 5 shows internal force models including vibration of the robot. FIG. 6 shows noise models.

As to the external force models, as shown in FIG. 4, for example, sensor data, no operation command value, a robot posture, no work and a force calculation value are input to a neural network as an input X and an external force is output therefrom as an output Y(5). A correct label is created on the assumption that a force exerted on the robot=an external force, an internal force=0 and noise=0. A plurality of pairs of the input X and the correct label are prepared as supervised data.

A. External Force Models

Circumstances where a human exerts a force on the robot are categorized and the force of each pattern is modeled in advance as a force model.

- a force model when the human collides against the machine or a wall
- a force model when the robot approaches and unintentionally collides against the operating human
- a force model when the human is caught between the robot and a peripheral device
- a force model of pressure, vibration and the like of a driver applied when a work is screwed onto a body of a car
- a force model when the robot and the human support a long work Next, jigs and the like are formed to generate the modeled external forces and each modeled force is exerted on the stopped robot. The robot takes a plurality of posture patterns and the force is exerted on a plurality of portions of the robot. At this time, for example, the robot 201 is preferably provided with the force sensors at individual axes or certain portions, to recognize which portion the force is exerted. A correct label is created on the conditions that sensor data, a calculated resultant force and a robot posture are input, and an exerted force is regarded as an external force, and an internal force including vibration of the robot and noise are set at "0". A plurality of pairs of an input and a correct label are prepared as supervised data to perform machine learning. A calculated input force may be used as the "exerted force".

As to the internal force models, as shown in FIG. 5, sensor data, an operation command value, a position and speed, a work type and a force calculation value are input to a neural network as an input X and an internal force including vibration of the robot is output therefrom as an output Y(5). A correct label is created on the assumption that an internal force including vibration of the robot=the force calculation value, an external force=0 and noise=0. A plurality of pairs of the input X and the correct label are prepared as supervised data.

B. Internal Force Models

As to a force occurring in the operation of the robot, when the weight of a work and the center of gravity of the robot having the work are known with high accuracy, the acceleration of the robot itself can be calculated from the operation command value of the robot and a logical internal force can be calculated based on the operation command value. However, the operation of the robot may swing the robot in itself (specifically, a hand portion), thus causing vibration. Since the force sensors detect a force due to the vibration of the robot, it is difficult to calculate a force component due to the vibration from the operation command value.

Thus, in this embodiment, as to an internal force including vibration of the robot, internal force models including vibration of the robot are generated, just as with the external force models, by performing various operations beforehand. Operating the robot with having a plurality of works makes it possible to generate the internal force models including vibration of the robot in a state of having the works. The internal force models including vibration of the robot differ from one type of the robot to another.

As a problem for measuring an internal force including vibration of the robot, there is a difficulty in measurement of the internal force by an external device of the robot system such as a load cell. Instead, a logical resultant force calculated in a preprocessor of the learning unit is used as a correct label of the internal force including vibration of the robot in learning. In other words, a correct label is created on the assumption that the calculated logical resultant force=the internal force including vibration of the robot, an external force=0 and noise=0. A plurality of pairs of an input and a correct label are prepared as supervised data for machine learning.

Moreover, as to noise models, as shown in FIG. 6, sensor data, no operation command value, a robot posture, a work type and a force calculation value are input to a neural network as an input X and noise is output therefrom as an output Y(5). A correct label is created on the assumption that noise=the force calculation value, an external force=0 and an internal force including vibration of the robot=0. A plurality of pairs of the input X and the correct label are prepared as supervised data.

C. Noise Models

Noise is categorized into various types.

- periodic noise and aperiodic noise of noise caused by outside vibration
- periodic noise and aperiodic noise of electrical noise Examples of Models

- vibration when a forklift passes nearby
- instantaneous vibration of a peripheral device applied in an impulsive manner
- a false detection when wind blows against the robot As to noise, models are generated, just as with the external force models and the internal force models including vibration of the robot, by applying various types of noise to the robot beforehand. The noise is applied to the stopped robot. The noise is applied to the robot that takes a plurality of postures. As a problem for measuring a force component due to the noise, there is a difficulty in measurement of the force component due to the noise by an external device of the robot system such as a load cell. Instead, a logical resultant force calculated in a preprocessor of the learning unit is used as a correct label of the noise in learning. In other words, a correct label is created on the assumption that the calculated logical resultant force=the noise, an external force=0 and an internal force including vibration of the robot=0. A plurality of pairs of an input and a correct label are prepared as supervised data for machine learning.

Note that, FIG. 4 to FIG. 6, which show the above-described neural networks, depict the outputs Y(5) as the external force, the internal force including the vibration of the robot and the noise, respectively, but the above-described neural networks are combined into one actual neural network. The following limitation is imposed on a force to be input to the neural network and each force component to be output therefrom.

[calculated resultant force(input portion)]=[external force]+[internal force including vibration of robot]+[noise]

To collect the supervised data of the noise (third force component), for example, a noise source (not shown) is exerted on the robot 1 stopped in each of the plurality of postures, and a force component (fourth force component) occurring by the noise source and an input to the learning unit 31 are collected in pairs. As a matter of course, the supervised data of the noise may be collected by other various methods.

Next, a teaching mode of an external force and noise by a user (human or operator) will be described. As to an external force and noise, a teaching mode can be provided in which a user teaches the external force and the noise. In the teaching mode, for example, a name of the type of a force is set before teaching, and the teaching is started in a state of stopping the robot. Since the more the number of the postures of the robot, the better a learning result is likely to be, the teaching is repeated by applying the same force while changing the posture. This operation may be performed under interactive guidance. As described above, for example, preparing the mode for teaching at least one of the external force applied to the robot 1 from outside (external force that a human exerts on the robot: first force component) and the internal force occurring in the operation of the robot 1 (second force component) allows learning using force models in accordance with the user's environment.

Figure 7:
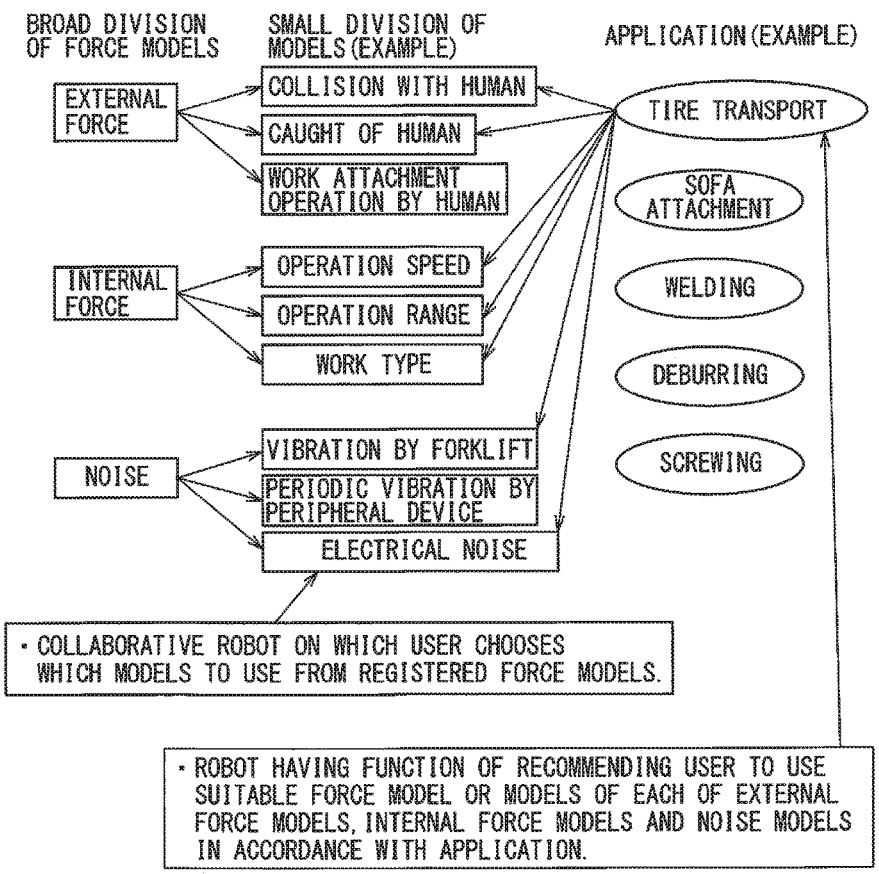
FIG. 7 is a drawing showing an example of the function of choosing force models.

FIG. 7 is a drawing of an example of a force model choice function in which tire transport is chosen from operations (applications) of the tire transport, sofa attachment, welding, deburring and screwing performed by a user (human) in collaboration with the human collaborative robot 1. First, force models are broadly separated into "external force models", "internal force (internal force including vibration of the robot) models" and "noise models". The "external force models" are further separated into, for example, "collision with human", "caught of human" and "work attachment operation by human". The "internal force models" are further separated into, for example, "operation speed", "operation range" and "work type". The "noise models" are further separated into, for example, "vibration by forklift", "periodic vibration by peripheral device" and "electrical noise".

At this time, when the tire transport is performed as an application, for example, the "collision with human" and the "caught of human" are chosen as small categories of the "external force models". The "operation speed", the "operation range" and the "work type" are chosen as small categories of the "internal force models". The "vibration by forklift" and the "electrical noise" are chosen as small categories of the "noise models". The human collaborative (cooperative) robot 1 (the human collaborative robot system 100) allows a user to choose which model to use from the registered force models, and furthermore has the function of recommending the user to use a suitable force model or models of each of the external force models, the internal force models and the noise models in accordance with the application.

In other words, the robot 1 (the robot system 100) has the function of choosing models the learning unit 31 learns, out of model clusters of the collected supervised data, or the function of recommending which force models to use in accordance with the application. Thus, it is possible to perform learning using the force models in accordance with the application of the user, and to easily choose the force models in accordance with the application of the user.

Figure 8:
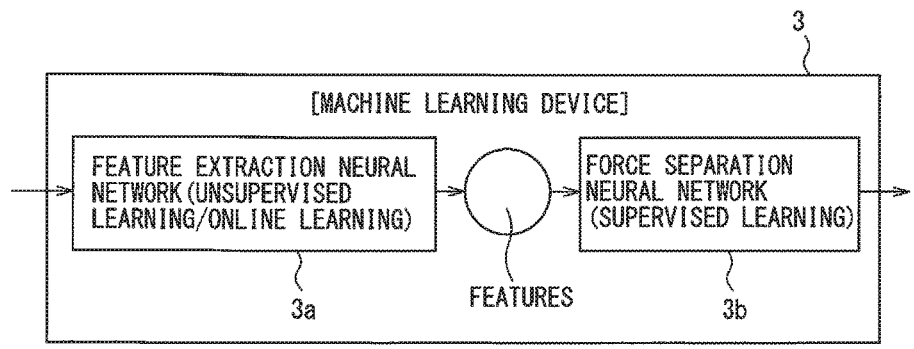
FIG. 8 is a drawing that shows an example of using an unsupervised learning neural network for extracting features.

FIG. 8 is a drawing showing an example of using an unsupervised learning neural network for extracting features. As shown in FIG. 8, the machine learning device 3 according to this embodiment includes a feature extraction neural network (unsupervised online learning) 3a and a force separation neural network (supervised learning) 3b. Features obtained by the feature extraction neural network 3a are provided for the force separation neural network 3b.

As shown in FIG. 8, in this embodiment, the unsupervised learning neural network 3a is prepared to extract features. Unsupervised learning is a learning algorithm in which a large amount of input data is provided for the learning unit to learn the distribution of the input data, and compression, classification, shaping and the like are applied to the input data without providing corresponding supervised output data. Data sets having similar features are clustered.

Since the unsupervised learning does not require supervised output data, the unsupervised learning can be always performed in real time during operation of the robot. New samples are supplied in a sequential manner as learning data, and learning is updated whenever the new learning data sample is supplied. This learning method is called online learning, and learning results can be used while continuing learning. In other words, the learning unit 31 performs the online learning to extract features of a detected force, and the detected force is separated into an external force (first force component), an internal force (second force component) and noise (third force component) based on the extracted features.

As another embodiment, there is also a method called semi-supervised learning as an intermediate problem setting between the supervised learning and the unsupervised learning, and this method may be used for learning. In the semi-supervised learning, a part of data includes pairs of an input and an output, and the other data includes only inputs.

Figure 9:
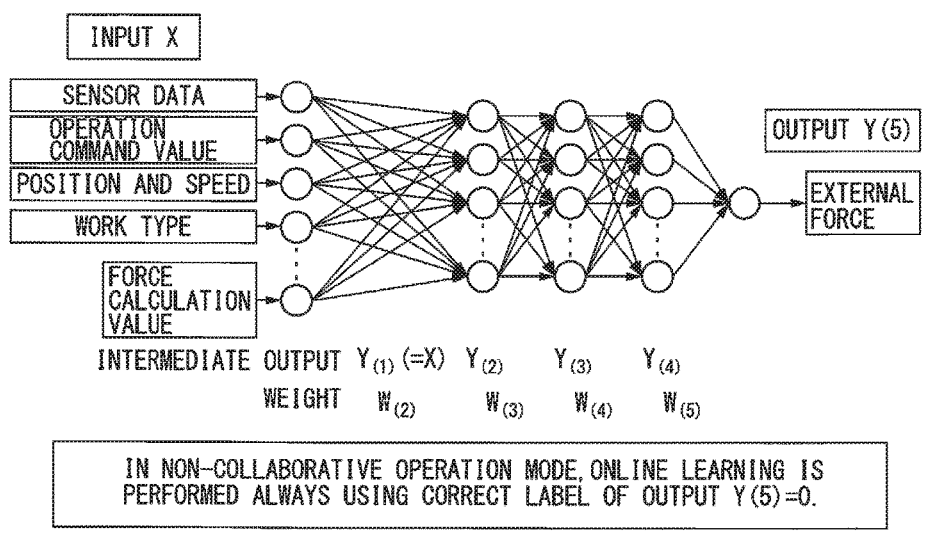
FIG. 9 is a drawing of an example of a non-collaborative operation mode of the robot.

FIG. 9 is a drawing of an example of a non-collaborative operation mode of the robot. As shown in FIG. 9, for example, sensor data, an operation command value, a position and speed, a work type and a force calculation value are input to a neural network as an input X and an external force is output therefrom as an output Y(5). In the non-collaborative operation mode, for example, online learning is performed always using a correct label of the output Y(5)=0.

In other words, the human collaborative robot 1 can be put in the non-collaborative operation mode in which an operation area is not shared with an operator (human). To be more specific, the human collaborative robot 1 is put in the non-collaborative operation mode, when a signal indicating that the operator gets out of space inside a safety bar in which the robot 1 operates or a signal indicating that no human is present near the robot detected by a scanner sensor is input to the control device (robot control device) 2.

In the non-collaborative operation mode, for example, the learning unit 31 constituted of a neural network performs online learning on the assumption that a force component applied from outside of the robot has a correct label of "0". In other words, the robot 1 can be put in the non-collaborative operation mode in which no operation area is shared with the human, and in the non-collaborative operation mode, the learning unit 31 performs online learning on the assumption that an external force (first force component) has a correct label of "0". Therefore, weights W of the neural network can be updated sequentially, and as a result, it is possible to increase accuracy in separating an external force.

Figure 10:
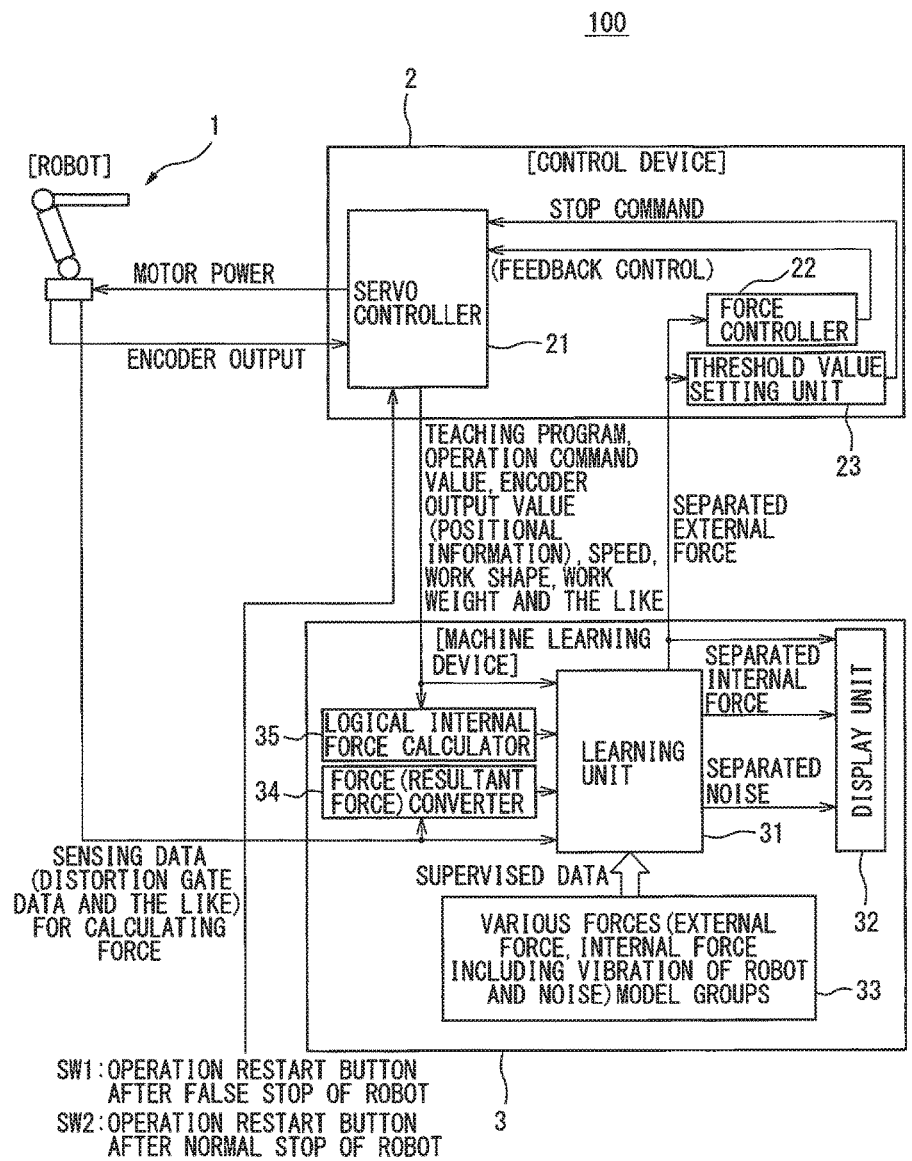
FIG. 10 is a block diagram of a modification example of the robot system shown in FIG. 1.
Figure 11:
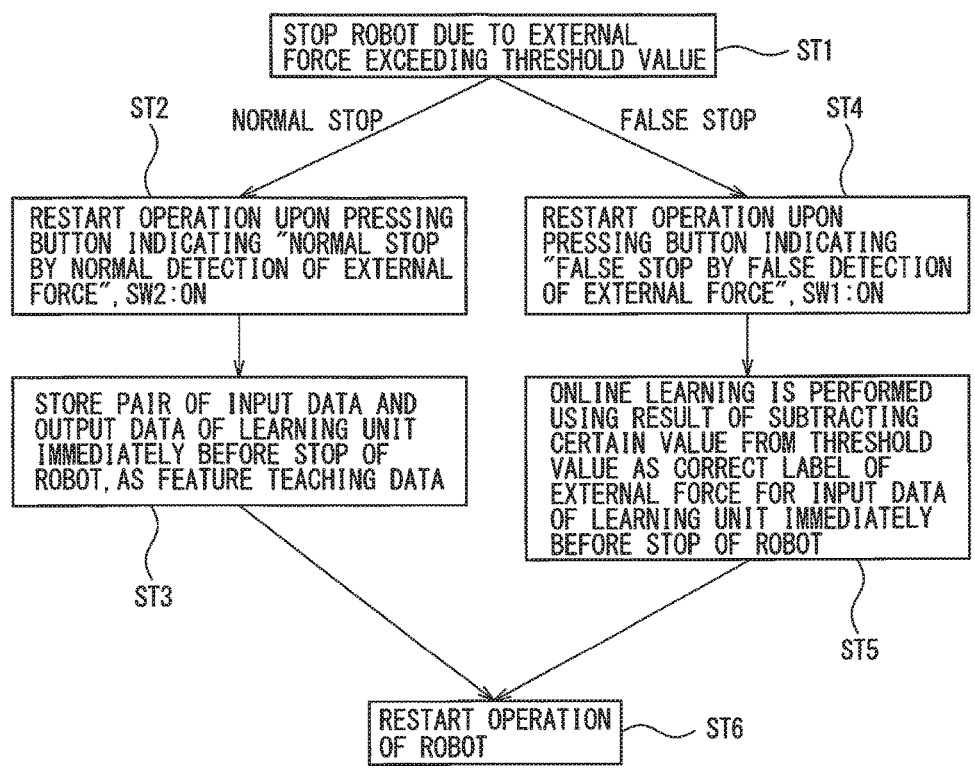
FIG. 11 is a (first) drawing that shows the operation of the robot system of FIG. 10 after a stop of the robot.
Figure 12:
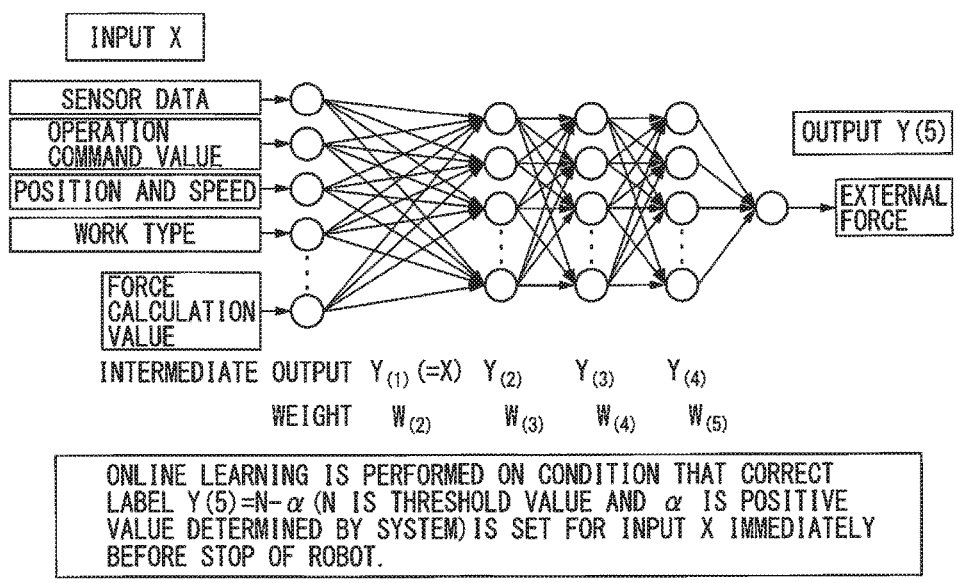
FIG. 12 is a (second) drawing that shows the operation of the robot system of FIG. 10 after the stop of the robot.

FIG. 10 is a block diagram of a modification example of the robot system shown in FIG. 1. FIG. 11 and FIG. 12 are drawings showing the operation of the robot system of FIG. 10 after stopping the robot. FIG. 11 is a flowchart showing the operation after stopping the robot, and FIG. 12 is a drawing of online learning of the neural network at that time.

As is apparent from comparison between FIG. 10 and FIG. 1, the robot system according to this modification example has two switches (operation restart buttons) SW1 and SW2 to perform a return process after stopping the robot. The operation restart button SW1 is a button to restart operation after the robot has mistakenly stopped. The operation restart button SW2 is a button to restart operation after the robot has normally stopped. An output of each of the two operation restart buttons SW1 and SW2 is input to the servo controller 21 and the learning unit 31.

As shown in FIG. 11, when the robot has stopped owing to an external force exceeding a threshold value, and the robot is determined to be stopped normally in step ST1, the operation proceeds to step ST2. A button indicating "a normal stop due to a normal detection of an external force" is pressed to restart the operation, in other words, the operation restart button SW2, which is to be pressed after a normal stop of the robot, is turned on. Next, in step ST3, a pair of input data and output data of the learning unit immediately before the stop of the robot is stored in a memory as future teaching data, and operation proceeds to step ST6 to restart the operation of the robot.

When the robot has stopped owing to an external force exceeding the threshold value, and the robot is determined to be stopped mistakenly in step ST1, the operation proceeds to step ST4. A button indicating "a false stop due to a false detection of an external force" is pressed to restart the operation, in other words, the operation restart button SW1, which is to be pressed after a false stop of the robot, is turned on. Next, in step ST5, online learning is performed on the condition that a result of subtracting a certain value from the threshold value is set as a correct label of the external force for input data of the learning unit immediately before the stop of the robot. Based on a result of the online learning using the newly set correct label, the operation proceeds to step ST6, and the robot restarts its operation.

As described above, the control device 2 of the robot 1 has the function of stopping the robot 1, when the separated external force (first force component) exceeds the certain threshold value. After the stop of the robot, when a signal (first input signal) indicating that the learning unit 31 has mistakenly detected the external force and stopped the robot is input, the learning unit performs the online learning on the condition that the input data immediately before the stop of the robot and the correct label of the external force that is set at a certain value lower than the threshold value are paired. Therefore, when the robot is mistakenly stopped due to improper separation of the external force, the online supervised learning is performed upon, for example, an input of the signal indicating a false stop by a user, thus improving the ability to separate an external force.

The control device 2 of the robot 1 has the function of stopping the robot 1, when the separated external force (first force component) exceeds the certain threshold value. After the stop of the robot, when a signal (second input signal) indicating that the learning unit 31 has normally detected the external force and stopped the robot is input, the input signal and the output signal to and from the learning unit 31 immediately before the stop of the robot are stored in the memory (although not shown, for example, a memory contained in the learning unit 31, a memory provided in the control device 2 or the like) as supervised data, and the supervised data stored in the memory is used in the online learning thereafter. Therefore, when a user inputs the signal indicating a normal separation of an external force and a normal stop of the robot, data at that time is stored as the supervised data, and supervised learning is performed using the data in future, thus improving the ability to separate an external force.

The first input signal and the second input signal may also function as an operation restart signal for the robot 1. Thus, the human's (user's) determination and the restart of the robot are performed at the same time, thus allowing a reduction of a load on the user. The machine learning device 3 or the control device 2, as well as the user (human), may automatically determine whether the robot is stopped normally or mistakenly based on, for example, a certain condition. In other words, the second input signal may be generated using, for example, an image recognition result by a camera (not shown) for imaging the robot, a signal from an approach sensor (not shown) and the like. Therefore, it is possible to automate the human's determination.

As shown in FIG. 12, for example, sensor data, an operation command value, a position and speed, a work type and a force calculation value are input to a neural network as an input X, and an external force is output therefrom as an output Y(5). The online learning is performed on the condition that the correct label $Y(5)=N-\alpha$ is set for the input X immediately before a stop of the robot. Note that, N represents a threshold value, and α represents a positive value determined by the system. In other words, as described above, the online learning is performed on the condition that a result of subtracting the certain value α from the threshold value N is determined as the correct label of the external force.

Figure 13:
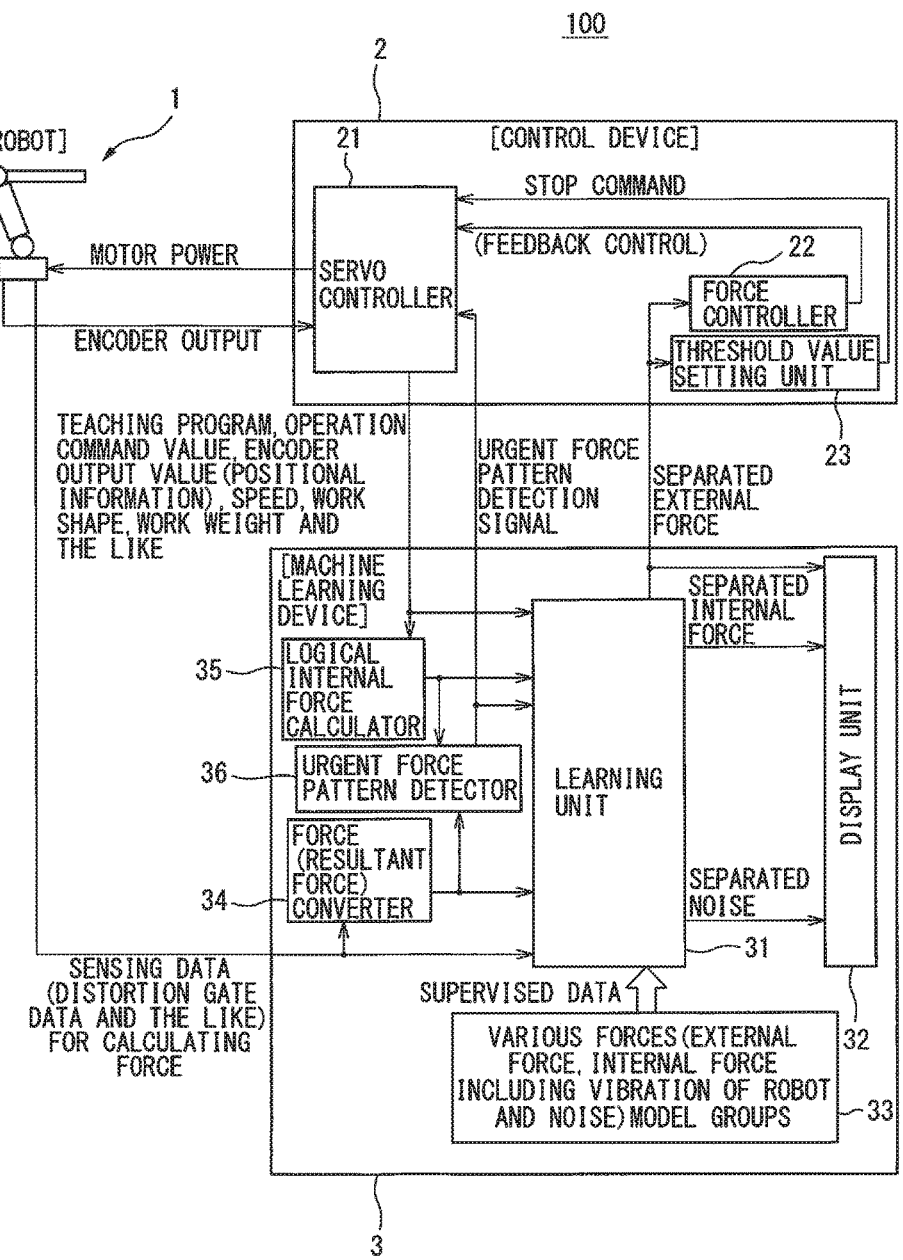
FIG. 13 is a block diagram of another modification example of the robot system shown in FIG. 1.
Figure 14:
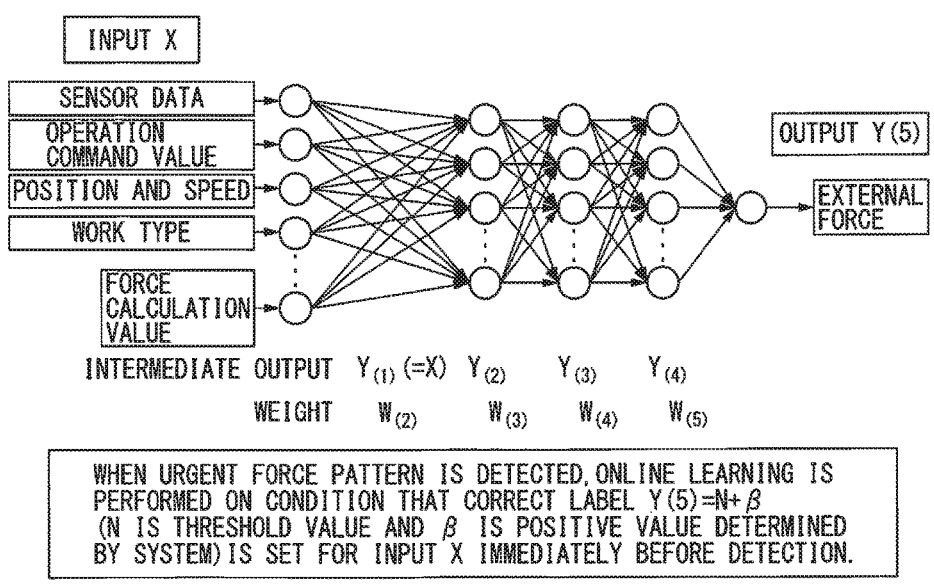
FIG. 14 is a drawing showing the operation of the robot system of FIG. 13 after an urgent stop of the robot.

FIG. 13 is a block diagram of another modification example of the robot system shown in FIG. 1. FIG. 14 is a drawing showing the operation of the robot system of FIG. 13 after a stop of the robot, and is a drawing of online learning of a neural network at that time.

As is apparent from comparison between FIG. 13 and FIG. 1, in the robot system according to this modification example, an urgent force pattern detector 36 is provided in the machine learning device 3. When an urgent force pattern is detected, an urgent force pattern detection signal is input to the servo controller 21 to stop the robot 1 in an urgent manner.

As shown in FIG. 14, for example, sensor data, an operation command value, a position and speed, a work type and a force calculation value are input to a neural network as an input X, and an external force is output therefrom as an output Y(5). When an urgent force pattern is detected, online learning is performed on the condition that the correct label $Y(5)=N+\beta$ is set for the input X immediately before a stop of the robot. Note that, N represents a threshold value, and β represents a positive value determined by the system. In other words, the online learning is performed on the condition that a result of adding the certain value β to the threshold value N is determined as the correct label of the external force.

By the way, in the robot system shown in FIG. 13 and FIG. 14, for example, force waveforms of reactions (pulling the robot strongly and the like) of an operator, when an external force is not normally detected and the robot does not stop unexpectedly, are preferably stored in the machine learning device 3 as characteristic "urgent" force patterns. To detect the patterns, an arithmetic operation may be performed such as subtraction of a logical internal force or calculation of a frequency component. Besides, learning may be performed in advance on a learning unit other than the learning unit for separating an external force from a detected force.

When the "urgent" force pattern is detected, it can be considered that an external force is not separated normally. Thus, as described above, online learning is performed on the condition that a correct label of an external force is set at the threshold value+β (β is a positive value determined by the system) for input data that is immediately before the detection of the "urgent" force pattern. By performing the online learning, when the same situation occurs in the robot system thereafter, the external force detection threshold value may increase the possibility of stopping the robot before the "urgent" force pattern occurs.

In other words, the robot system 100 has the function of stopping the robot 1 when a separated external force (first force component) exceeds a certain threshold value, and the function of detecting an urgent force pattern when a user stops the robot 1 by application of an external force. When the urgent force pattern is detected, the learning unit 31 performs online learning on the condition that input data that is immediately before the detection of the urgent force pattern and the correct label of the external force that is set at a certain value higher than the threshold value are paired. Therefore, as a measure in a case where the robot is not stopped by application of an external force owing to false separation of the external force, the function of detecting the urgent force pattern is provided. When the urgent force pattern is detected, online supervised learning is performed to improve the ability to separate an external force.

For example, a plurality of robots 1 may be provided, and each of the robots 1 performs learning independently. The robots 1 may mutually exchange or share learning results that are independently obtained by the robots 1 through a network (communication lines).

Figure 15:
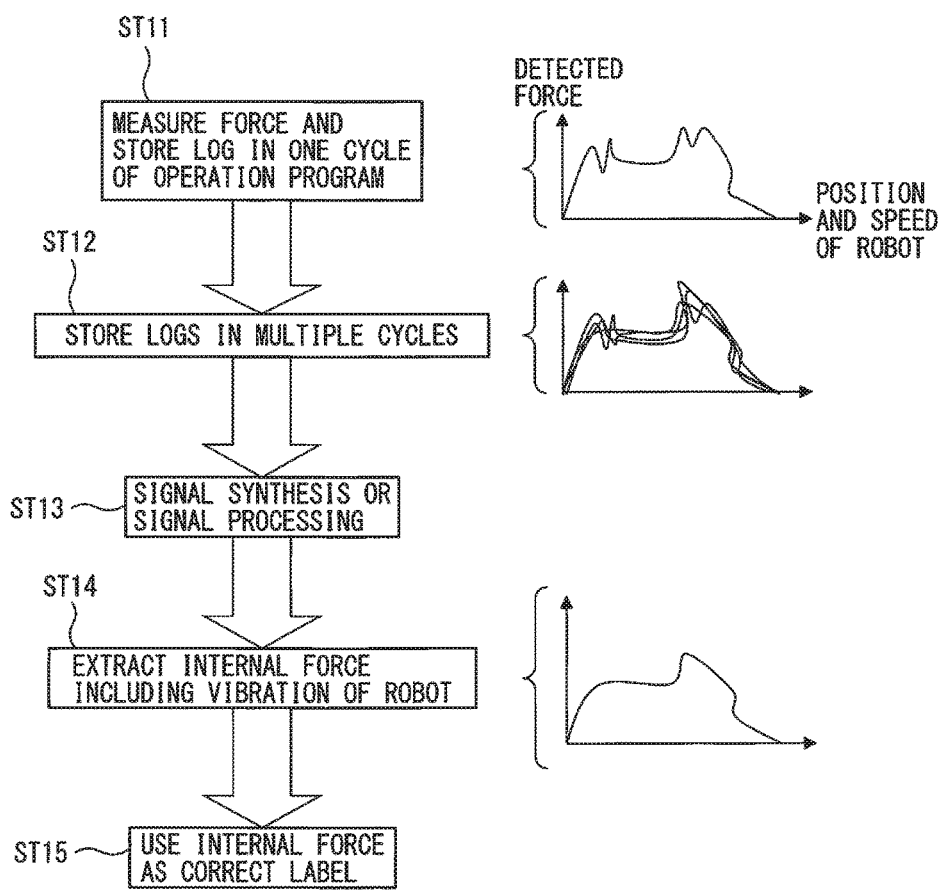
FIG. 15 is a flowchart showing an example of a method for calculating a correct label in the robot system according to the embodiment of the present invention.
Figure 16:
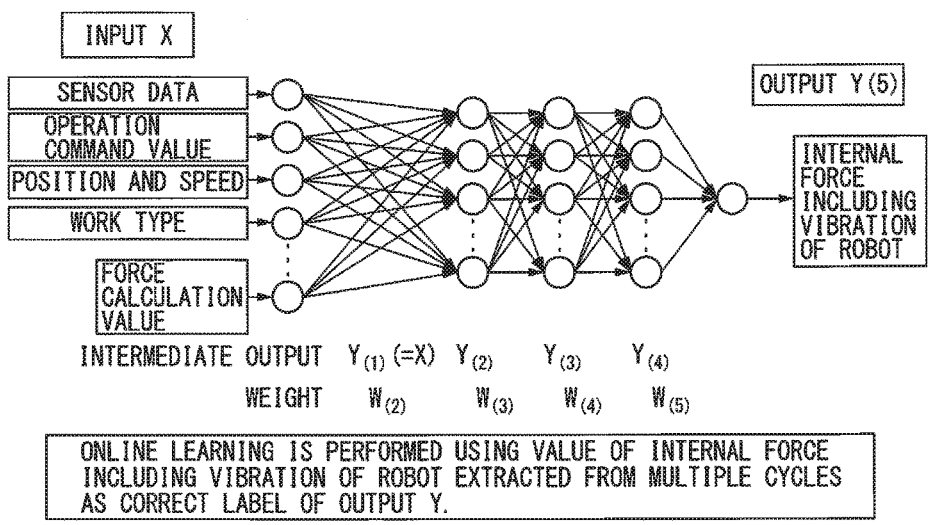
FIG. 16 is a drawing showing an example of a method for calculating a correct label in the robot system according to the embodiment of the present invention.

FIG. 15 and FIG. 16 are drawings showing an example of a method for obtaining a correct label in the robot system according to the embodiment of the present invention. FIG. 15 is a flowchart showing an example of a method for obtaining a correct label, and FIG. 16 is a drawing of online learning of a neural network at that time.

As shown in FIG. 15, in step ST11, a force is measured and a log is stored in one cycle of an operation program. The operation proceeds to step ST12, and logs are stored in a plurality of cycles. Signal synthesis or signal processing is performed in step ST13. An internal force including vibration of the robot is extracted in step ST14, and the internal force is used as a correct label in step ST15.

As shown in FIG. 16, for example, sensor data, an operation command value, a position and speed, a work type and a force calculation value are input to a neural network as an input X, and an internal force including vibration of the robot is output therefrom as an output Y(5). Online learning is performed on the condition that the value of the internal force including vibration of the robot extracted in the cycles is set as a correct label of the output Y(5).

In the robot system described with reference to FIG. 15 and FIG. 16, for example, logging and averaging the measurement results of the cycles facilitate reducing the effects of stops by an external force and the effect of noise. Since the internal force data including vibration of the robot obtained in such a manner is set as the correct label, online learning can be performed on the internal force including vibration of the robot.

However, when the work type is changed or the center of gravity of the robot is changed due to a change in holding position of a work, the averaging operation does not make sense. In the case of such a change, it is necessary to discard the correct labels obtained until then, and to re-log measurement results in a plurality of cycles.

In other words, the robot 1 stores a log of a force detected by the robot 1 in one cycle of a taught operation program, and stores logs of the force detected by the robot 1 in a plurality of cycles. Signal synthesis or signal processing is applied to the logs of the force detected in the cycles, to extract a force component occurring in the operation of the robot 1. The extracted force component occurring in the operation of the human collaborative robot is set as a correct label, and online learning is performed on the learning unit 31. Therefore, it is possible to enhance the ability to separate an internal force including vibration of the robot from a force detected by the robot, and accordingly improve accuracy in separating an external force.

The human collaborative robot system according to the present invention has the effect of improving accuracy in detection of an external force.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A human collaborative robot system having a function of detecting a force, the human collaborative robot system comprising:
   a human collaborative robot that performs operation in collaboration with a human; and
   a learning unit which
      receives
         sensing data for calculating the force,
         internal data of control software for controlling the human collaborative robot, and
         data of the calculated force obtained based on at least one of the sensing data and the internal data,
      performs learning using supervised data in which inputs and correct labels obtained in advance of said learning are collected in pairs, wherein the correct labels of the supervised data are obtained in advance by
         exerting a force on the human collaborative robot from outside,
         operating the human collaborative robot over a plurality of paths, and
         applying noise to the human collaborative robot, and
      based on a result of said learning, extracts from the data of the calculated force
         a first force component applied to the human collaborative robot from outside,
         a second force component occurring in the operation of the human collaborative robot, and
         a third force component categorized as noise,
   wherein the operation of the human collaborative robot is controlled based on the extracted first force component output from the learning unit.

2. The human collaborative robot system according to claim 1, wherein forces having different magnitudes and different directions are exerted on a plurality of portions of the human collaborative robot stopped in a plurality of postures, and the exerted forces and the inputs to the learning unit are collected in pairs as the supervised data of the first force component.

3. The human collaborative robot system according to claim 1, wherein force components occurring when the human collaborative robot operates over the plurality of paths, while holding a plurality of types of works, and the inputs to the learning unit are collected in pairs as the supervised data of the second force component.

4. The human collaborative robot system according to claim 1, wherein a noise source is applied to the human collaborative robot stopped in a plurality of postures, and fourth force components occurring by the noise source and the inputs to the learning unit are collected in pairs as the supervised data of the third force component.

5. The human collaborative robot system according to claim 2, wherein a mode for teaching at least one of the first force component and the second force component is prepared.

6. The human collaborative robot system according to claim 2, wherein the human collaborative robot includes:
   a function of choosing a model group to be learned by the learning unit from model groups of the collected supervised data; or
   a function of recommending a model group to be used in accordance with an application, from model groups of a recorded force.

7. The human collaborative robot system according to claim 1, wherein the learning unit performs online learning.

8. The human collaborative robot system according to claim 1, wherein, when the human collaborative robot is put in a non-collaborative operation mode in which no operation area is shared with the human, the learning unit performs online learning with a correct label of the first force component set at "0".

9. The human collaborative robot system according to claim 1, wherein
   the human collaborative robot includes a control device which stops the human collaborative robot in response to the first force component exceeding a certain threshold value, and
   after the stop of the human collaborative robot, in response to a first input signal indicating that the stop is caused by a false detection of the first force component by the learning unit, the learning unit performs online learning using input data immediately before the stop of the human collaborative robot and a correct label of an external force set at a value lower than the certain threshold value in a pair.

10. The human collaborative robot system according to claim 9, wherein
   after the stop of the human collaborative robot, in response to a second input signal indicating that the stop is caused by a normal detection of the first force component by the learning unit, an input signal to and an output signal from the learning unit immediately before the stop of the human collaborative robot are stored in a memory as the supervised data, and the supervised data stored in the memory is used in online learning thereafter.

11. The human collaborative robot system according to claim 10, wherein the first input signal and the second input signal are operation restart signals for the human collaborative robot.

12. The human collaborative robot system according to claim 10, wherein
   the second input signal is
      a human-generated signal, or
      a signal generated using an image recognition result by a camera for imaging the human collaborative robot, or
      a signal from an approach sensor.

13. The human collaborative robot system according to claim 1, wherein
   the human collaborative robot system
      stops the human collaborative robot in response to the first force component exceeding a certain threshold value, and
      detects an urgent force pattern when the human collaborative robot is stopped by a human-applied external force, and
   in response to a detection of the urgent force pattern, the learning unit performs online learning using input data immediately before the detection of the urgent force pattern and a correct label of an external force set at a value higher than the certain threshold value in a pair.

14. The human collaborative robot system according to claim 1, further comprising:
   a plurality of human collaborative robots, wherein
   each of the human collaborative robots performs learning in an independent manner, and
   the human collaborative robots mutually exchange or share a plurality of results of learning independently performed by each of the human collaborative robots through a network.

15. The human collaborative robot system according to claim 1, wherein
   the first force component is a human-applied external force exerted on the human collaborative robot;
   the second force component is an internal force generated in the operation of the human collaborative robot; and
   the third force component is noise applied to the human collaborative robot, or
   the human collaborative robot performs:
      storing a log of a force detected by the human collaborative robot in one cycle of a taught operation program;
      storing logs of the force detected in a plurality of cycles;
      applying signal synthesis or signal processing to the logs of the force detected in the cycles, to extract a force component occurring in the operation of the robot; and
      performing online learning by the learning unit, using the extracted force component occurring in the operation of the human collaborative robot as a correct label.

* * * * *